US008487020B2

(12) United States Patent
Galeone et al.

(10) Patent No.: US 8,487,020 B2
(45) Date of Patent: *Jul. 16, 2013

(54) MICROCAPSULES CONTAINING CURABLE SILOXANES

(75) Inventors: Fabrizio Galeone, Buvrinnes (BE); Axel Kretschmer, Nivelles (BE); Leon Marteaux, Brussels (BE); Jean-Thierry Simonnet, Chevilly-Larue (FR); Brett Lee Zimmerman, Frankenmuth, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,367

(22) PCT Filed: Jun. 28, 2010

(86) PCT No.: PCT/US2010/040124
§ 371 (c)(1),
(2), (4) Date: Dec. 20, 2011

(87) PCT Pub. No.: WO2011/002695
PCT Pub. Date: Jan. 6, 2011

(65) Prior Publication Data
US 2012/0101227 A1 Apr. 26, 2012

Related U.S. Application Data

(60) Provisional application No. 61/222,200, filed on Jul. 1, 2009.

(51) Int. Cl.
*C08K 9/10* (2006.01)
*B32B 5/30* (2006.01)

(52) U.S. Cl.
USPC ........... 523/209; 523/203; 523/204; 523/207; 523/212; 523/216; 525/477; 525/478; 428/403; 428/404; 428/405; 524/837; 528/15

(58) Field of Classification Search
None
See application file for complete search history.

(56) References Cited

U.S. PATENT DOCUMENTS

| | | | |
|---|---|---|---|
| 2,823,218 A | 2/1958 | Speier et al. | |
| 3,159,601 A | 12/1964 | Ashby | |
| 3,220,972 A | 11/1965 | Lamoreaux | |
| 3,296,291 A | 1/1967 | Chalk | |
| 3,419,593 A | 12/1968 | Willing | |
| 3,516,946 A | 6/1970 | Modic | |
| 3,715,334 A | 2/1973 | Karstedt | |
| 3,814,730 A | 6/1974 | Karstedt | |
| 3,923,705 A | 12/1975 | Smith | |
| 3,989,668 A | 11/1976 | Lee et al. | |
| 4,248,751 A * | 2/1981 | Willing | 524/588 |
| 4,293,677 A | 10/1981 | Imai | |
| 4,766,176 A | 8/1988 | Lee et al. | |
| 4,784,879 A | 11/1988 | Lee et al. | |
| 5,036,117 A | 7/1991 | Chung et al. | |
| 5,175,325 A | 12/1992 | Brown et al. | |
| 6,159,453 A | 12/2000 | Avnir et al. | |
| 6,238,650 B1 | 5/2001 | Lapidot et al. | |
| 6,303,149 B1 | 10/2001 | Magdassi et al. | |
| 6,326,015 B1 | 12/2001 | Tucci et al. | |
| 2005/0013990 A1 | 1/2005 | Cavallaro et al. | |
| 2005/0212008 A1 | 9/2005 | Miyoshi | |
| 2007/0142575 A1 | 6/2007 | Zheng et al. | |
| 2008/0279901 A1 | 11/2008 | Prigent et al. | |
| 2009/0252809 A1 | 10/2009 | Galeone et al. | |
| 2012/0156269 A1 * | 6/2012 | Simonnet et al. | 424/401 |

FOREIGN PATENT DOCUMENTS

| | | |
|---|---|---|
| EP | 281034 | 2/1988 |
| EP | 0347895 | 11/1993 |
| EP | 941761 | 6/2002 |
| EP | 934773 | 2/2004 |
| EP | 1935454 | 6/2008 |
| GB | 2051102 | 1/1981 |
| GB | 2416524 | 2/2006 |
| JP | 51-78995 | 7/1993 |
| JP | 06-107950 | 4/1994 |
| WO | 9831333 | 7/1998 |
| WO | 0071084 | 11/2000 |
| WO | 0180823 | 11/2001 |
| WO | 03066209 | 8/2003 |
| WO | 2005009604 | 2/2005 |
| WO | 2008002637 | 1/2008 |
| WO | 2010030748 | 3/2010 |

OTHER PUBLICATIONS

"Composite Particles of Silica/Poly(dimethylsiloxane)" authored by Sertchook et al. and published in Chemistry of Materials (2005) 17, 4711-4716.*

* cited by examiner

*Primary Examiner* — Marc Zimmer
(74) *Attorney, Agent, or Firm* — Howard & Howard Attorneys PLLC

(57) ABSTRACT

Aqueous suspensions of silicate shell microcapsules are disclosed wherein a first portion of the silicate shell microcapsules contain an organopolysiloxane having at least two alkenyl groups and a hydrosilylation catalyst as Part A of a curable siloxane composition, and a second portion of the silicate shell microcapsules contain an organohydrogensiloxane as Part B of the curable siloxane composition.

14 Claims, No Drawings

MICROCAPSULES CONTAINING CURABLE SILOXANES

CROSS REFERENCE TO RELATED APPLICATIONS

This application is a U.S. national stage filing under 35 U.S.C. §371 of PCT Application No. PCT/US10/40124 filed on 28 Jun. 2010, currently pending, which claims the benefit of US Patent Application No. 61/222,200 filed 1 Jul. 2009 under 35 U.S.C. §119 (e). PCT Application No. PCT/US10/40124 and US Patent Application No. 61/222,200 are hereby incorporated by reference.

TECHNICAL FIELD

This disclosure relates to aqueous suspensions of silicate shell microcapsules wherein a first portion of the silicate shell microcapsules contain an organopolysiloxane having at least two alkenyl groups and a hydrosilylation catalyst as Part A of a curable siloxane composition, and a second portion of the silicate shell microcapsules contain an organohydrogensiloxane as Part B of the curable siloxane composition.

BACKGROUND

Water-based hydrosilylation curable siloxane compositions are commonly used in many industrial processes, for example for paper coating applications. Typically, they are two component emulsion systems where a first emulsion contains a hydrosilylation catalyst and a vinyl terminated polydimethylsiloxane (PDMS) while the other emulsion contains an organohydrogensiloxane. When the two emulsion parts are mixed together, a composition ripening phenomena may occur from the diffusion of the components from the various emulsion particles resulting in premature curing of the composition. As a result a cure inhibitor is typically added in the mix in order to extend the "bath life" of the coating compositions. The final cure of the mix is obtained by the evaporation of the cure inhibitor at high temperature following a coating process.

Thus, a need exists to provide hydrosilylation curable siloxane compositions for use in water based systems that eliminate the need for the addition of cure inhibitors to extend bath life of the coating compositions, and allow for low temperature cure.

SUMMARY

The present inventors have discovered microencapsulated hydrosilylation curable siloxane compositions that cure at room temperature, show extended bath life times, and also have lower extractable content than corresponding emulsion based compositions.

The present disclosure provides aqueous suspensions of silicate shell microcapsules of a two part curable siloxane composition. More specifically, the aqueous suspension contains a mixture of silicate shell microcapsules wherein a portion of the silicate shell microcapsules contain as a core the first part (Part A) of a curable siloxane composition while another portion of the microcapsules contain the second part (Part B) of the curable siloxane composition. When the two part curable compositions are released from the microcapsules under certain conditions, the two compositions react to form a cured siloxane composition.

DETAILED DESCRIPTION

The curable siloxane composition encapsulated in silicate shell microcapsules of the present aqueous suspensions may be any hydrosilylation curable siloxane composition. Such hydrosilylation curable siloxane compositions typically involve the reaction of an organopolysiloxane containing alkenyl groups with an organohydrogensiloxane in the presence of a hydrosilylation catalyst.

A portion of the silicate shell microcapsules in the present aqueous suspensions contain as a core, one part (Part A) of a curable composition. Part A of the curable siloxane composition contains at least two components;
  a) an organopolysiloxane having at least two silicon-bonded alkenyl groups per molecule, and
  b) a hydrosilylation catalyst.

A second portion of the microcapsules in the aqueous suspension contains the second part (Part B) of the curable siloxane composition. Part B of the curable siloxane composition contains at least one
  c) organohydrogensiloxane.

In one embodiment, Part B of the curable siloxane composition contains a combination of both components a) and c), that is a mixture of the an organopolysiloxane having at least two silicon-bonded alkenyl groups per molecule and the organohydrogensiloxane.

In a further embodiment, the amounts of components a) and c) used in Part B of the curable siloxane composition is such so as to provide a molar ratio of SiH/alkenyl group that varies from 3 to 10.

Each component is described in detail as follows.
a) The Organopolysiloxane Having at Least Two Silicon-Bonded Alkenyl Groups Organopolysiloxanes are polymers containing siloxy units independently selected from $(R_3SiO_{1/2})$, $(R_2SiO_{2/2})$, $(RSiO_{3/2})$, or $(SiO_{4/2})$ siloxy units, where R is typically a hydrocarbon group. These siloxy units can be combined in various manners to form cyclic, linear, or branched structures. The chemical and physical properties of the resulting polymeric structures can vary. For example organopolysiloxanes can be volatile fluids, low viscosity fluids, high viscosity fluids/gums, elastomers, rubbers, or resins.

Component a) may be selected from any organopolysiloxane, or mixture of organopolysiloxanes comprising at least two siloxy units represented by the formula $$R^2R_mSiO_{(4-m)/2}$$

wherein
R is an hydrocarbon group containing 1 to 20 carbon atoms,
$R^2$ is an alkenyl group containing 2 to 12 carbon atoms, and
m is zero to 2.
The $R^2$ alkenyl groups of Component a) are exemplified by vinyl, allyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl and 4,8-nonadienyl.

The $R^2$ alkenyl group may be present on any mono, di, or tri siloxy unit in the organopolysiloxane, for example; $(R^2R_2SiO_{1/2})$, $(R^2RSiO_{2/2})$, or $(R^2SiO_{3/2})$; as well as in combination with other siloxy units not containing an $R^2$ substituent, such as $(R_3SiO_{1/2})$, $(R^2SiO_{2/2})$, $(RSiO_{3/2})$, or $(SiO_{4/2})$ siloxy units where R is a hydrocarbon containing 1 to 20 carbons, alternatively an alkyl group containing 1 to 12 carbons, alternatively an alkyl group containing 1 to 6 carbons or alternatively methyl; providing there are at least two $R^2$ substituents in the organopolysiloxane. The monovalent hydrocarbon group R having from 1 to 20 carbon atoms is exemplified by alkyl groups such as: methyl, ethyl, propyl, butyl, hexyl, octyl, and decyl; cycloaliphatic groups such as cyclohexyl; aryl groups such as phenyl, tolyl, and xylyl, and aralkyl groups such as benzyl and phenylethyl.

Representative, non-limiting, examples of such organopolysiloxanes suitable as component a) include those having the average formula;

$(R_2R^2SiO_{1/2})_v(R_2SiO_{2/2})_x$ $(R^2R^2SiO_{1/2})_v(R_2SiO_{2/2})_x(R^2RSiO_{2/2})_y$ $(R^2R^2SiO_{1/2})_v(R_2SiO_{2/2})_x(RSiO_{3/2})_z$ $(R_2R^2SiO_{1/2})_v(R_2SiO_{2/2})_x(RSiO_{3/2})_z(SiO_{4/2})_w$ $(R_2R^2SiO_{1/2})_v(SiO_2)_w(R_2SiO)_x$ $(R^3SiO_{1/2})_v(R_2SiO)_x(R^2RSiO_{2/2})_y$ $(R^3SiO_{1/2})_v(R_2SiO)_x(R^2RSiO)_y$ $(R_3SiO_{1/2})_v(R_2SiO)_x(R^2RSiO)_y(RSiO_{3/2})_z$ $(R^3SiO_{1/2})_v(R_2SiO)_x(R^2RSiO)_y(SiO_2)_w$ $(R_3SiO_{1/2})_v(R_2SiO)_x(R^2RSiO)_y(SiO_2)_w(RSiO_{3/2})_z$ $(R^3SiO_{1/2})_v(R_2SiO)_x(R^2SiO_{3/2})_z$ where $v \geqq 2$, $w \geqq 0$, $x \geqq 0$, $y \geqq 2$, and z is $\geqq 0$, R and $R^2$ are as defined above.

Component a) may also be a mixture of any of the aforementioned organopolysiloxanes. The molecular weights may vary, and are not limiting. However, when molecular weights become too high or if the organopolysiloxane is a solid, it may be difficult to handle or incorporate the organopolysiloxane in the microcapsules as a core material. Thus, it may be desirable to dilute component a) in a suitable solvent or lower molecular weight fluid, such as a less viscous silicone fluid. Typically the viscosity at 25° C. of component a) or dispersion of component a) in another fluid may vary from 1 to 10,000 mPa·s, alternatively, 50 to 1000 mPa·s, or alternatively, 100 to 1000 mPa·s.

Component a) may be selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 10 to 300, or alternatively having a viscosity at 25° C. of 10 to 1000 mPa·s.

Alternatively component a) may be selected from vinyl functional endblocked polydimethylsiloxanes (vinyl siloxanes) or hexenyl functional endblocked polydimethylsiloxanes (hexenyl siloxanes), such as those having the average formula;

$CH_2=CH(Me)_2SiO[Me_2SiO]_xSi(Me)_2CH=CH_2$ $CH_2=CH-(CH_2)_4-(Me)_2SiO[Me_2SiO]_xSi(Me)_2-(CH_2)_4-CH=CH_2$ $Me_3SiO[(Me)_2SiO]_{x'}[CH_2=CH(Me)SiO]_{x''}SiMe_3$ wherein Me is methyl, x'0, alternatively x is 0 to 200, alternatively x is 10 to 150, x"2, alternatively x" is 2 to 50, alternatively x" is 2 to 10.

Vinyl or hexenyl functional polydimethylsiloxanes are known, and there are many commercially available. Representative, non-limiting examples include DOW CORNING® fluids; SFD 128, DC4-2764, DC2-7891, DC2-7754, DC2-7891, and DC2-7463, SFD-117, SFD-119, SFD 120, SFD 129, DC5-8709, LV, 2-7038, DC 2-7892, 2-7287, 2-7463, and dihexenyl terminal DC7692, DC7697 (Dow Corning Corporation, Midland, Mich.).

b) The Hydrosilylation Catalyst

Component b) is a hydrosilylation catalyst. The hydrosilylation catalyst may be any suitable Group VIII metal based catalyst selected from a platinum, rhodium, iridium, palladium or ruthenium. Group VIII group metal containing catalysts useful to catalyze curing of the present compositions can be any of those known to catalyze reactions of silicon bonded hydrogen atoms with silicon bonded unsaturated hydrocarbon groups. The preferred Group VIII metal for use as a catalyst to effect cure of the present compositions by hydrosilylation is a platinum based catalyst. Some preferred platinum based hydrosilylation catalysts for curing the present composition are platinum metal, platinum compounds and platinum complexes.

Suitable platinum catalysts are described in U.S. Pat. No. 2,823,218 (commonly referred to as "Speier's catalyst) and U.S. Pat. No. 3,923,705. The platinum catalyst may be "Karstedt's catalyst", which is described in Karstedt's U.S. Pat. Nos. 3,715,334 and 3,814,730. Karstedt's catalyst is a platinum divinyl tetramethyl disiloxane complex typically containing about one-weight percent of platinum in a solvent such as toluene. Alternatively the platinum catalyst may be a reaction product of chloroplatinic acid and an organosilicon compound containing terminal aliphatic unsaturation, as described in U.S. Pat. No. 3,419,593. Alternatively, the hydrosilyation catalyst is a neutralized complex of platinum chloride and divinyl tetramethyl disiloxane, as described in U.S. Pat. No. 5,175,325.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^2_4$, $H_aRh_bolefin_cCl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^4)(En)_2]_2$, or $(Ir(Z^4)(Dien)]_2$, where $Z^4$ is chlorine, bromine, iodine, or alkoxy, En is an olefin and Dien is cyclooctadiene may also be used.

Further suitable hydrosilylation catalysts are described in, for example, U.S. Pat. Nos. 3,159,601; 3,220,972; 3,296,291; 3,516,946; 3,989,668; 4,784,879; 5,036,117; and 5,175,325 and EP 0 347 895 B.

The hydrosilylation catalyst may be added to Part A in an amount equivalent to as little as 0.001 part by weight of elemental platinum group metal, per one million parts (ppm) of the total curable siloxane composition (that is Parts A and B combined). Typically, the concentration of the hydrosilylation catalyst in the curable siloxane composition is that capable of providing the equivalent of at least 1 part per million of elemental platinum group metal. A catalyst concentration providing the equivalent of 1 to 500, alternatively 50 to 500, alternatively 50 to 200 parts per million of elemental platinum group metal may be used.

c) The Organohydrogensiloxane

Component c) is an organohydrogensiloxane having an average of greater than two silicon bonded hydrogen atoms per molecule. As used herein, an organohydrogensiloxane is any organopolysiloxane containing a silicon-bonded hydrogen atom (SiH).

Organohydrogensiloxanes are organopolysiloxanes having at least one SiH containing siloxy unit, that is at least one siloxy unit in the organopolysiloxane has the formula $(R_2HSiO_{1/2})$, $(RHSiO_{2/2})$, or $(HSiO_{3/2})$. Thus, the organohydrogensiloxanes useful in the present invention may comprise any number of $(R_3SiO_{1/2})$, $(R_2SiO_{2/2})$, $(RSiO_{3/2})$, $(R_2HSiO_{1/2})$, $(RHSiO_{2/2})$, $(HSiO_{3/2})$ or $(SiO_{4/2})$ siloxy units, providing there are on average at least two SiH siloxy units in the molecule. Component c) can be a single linear or branched organohydrogensiloxane or a combination comprising two or more linear or branched organohydrogensiloxanes that differ in at least one of the following properties; structure, viscosity, average molecular weight, siloxane units, and sequence. There are no particular restrictions on the molecular weight of the organohydrogensiloxane, but typically the viscosity of the organohydrogensiloxane at 25° C. is from 3 to 10,000 mPa·s, alternatively 3 to 1,000 mPa·s, or alternatively 10 to 500 mP·s.

The amount of SiH units present in the organohydrogensiloxane may vary, providing there are at least two SiH units per organohydrogensiloxane molecule. The amount of SiH units present in the organohydrogensiloxane is expressed herein as % SiH which is the weight percent of hydrogen in the organohydrogensiloxane. Typically, the % SiH varies from 0.01 to 10%, alternatively from 0.1 to 5%, or alternatively from 0.5 to 2%.

The organohydrogensiloxane may comprise the average formula;

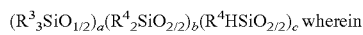

$(R^3{}_3SiO_{1/2})_a(R^4{}_2SiO_{2/2})_b(R^4HSiO_{2/2})_c$ wherein $R^3$ is hydrogen or $R^4$, $R^4$ is a monovalent hydrocarbon group having from 1 to 10 carbon atoms $a \geq 2$, $b \geq 0$, alternatively b=1 to 500, alternatively b=1 to 200, $c \geq 2$, alternatively c=2 to 200, alternatively c=2 to 100.

$R^4$ may be a substituted or unsubstituted aliphatic or aromatic hydrocarbyl. Monovalent unsubstituted aliphatic hydrocarbyls are exemplified by, but not limited to alkyl groups such as methyl, ethyl, propyl, pentyl, octyl, undecyl, and octadecyl and cycloalkyl groups such as cyclohexyl. Monovalent substituted aliphatic hydrocarbyls are exemplified by, but not limited to halogenated alkyl groups such as chloromethyl, 3-chloropropyl, and 3,3,3-trifluoropropyl. The aromatic hydrocarbon group is exemplified by, but not limited to, phenyl, tolyl, xylyl, benzyl, styryl, and 2-phenylethyl.

In another aspect, the organohydrogensiloxane may contain additional siloxy units and have the average formula

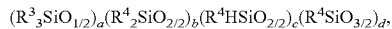

$(R^3{}_3SiO_{1/2})_a(R^4{}_2SiO_{2/2})_b(R^4HSiO_{2/2})_c(R^4SiO_{3/2})_d$,

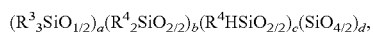

$(R^3{}_3SiO_{1/2})_a(R^4{}_2SiO_{2/2})_b(R^4HSiO_{2/2})_c(SiO_{4/2})_d$,

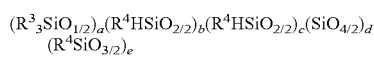

$(R^3{}_3SiO_{1/2})_a(R^4HSiO_{2/2})_b(R^4HSiO_{2/2})_c(SiO_{4/2})_d$
$(R^4SiO_{3/2})_e$ or any mixture thereof, where $R^3$ is hydrogen or $R^4$, $R^4$ is a monovalent hydrocarbyl, and $a \geq 2$, $b \geq 0$, $c \geq 2$, $d \geq 0$, and e is $\geq 0$.

In another embodiment, the organohydrogensiloxane is selected from a dimethyl, methyl-hydrogen polysiloxane having the average formula;

$(CH_3)_3SiO[(CH_3)_2SiO]_b[(CH_3)HSiO]_cSi(CH_3)_3$ where $b \geq 0$, alternatively, b=1 to 200, alternatively b=1 to 100, and $c \geq 2$, alternatively, c=2 to 100, alternatively c=2 to 50.

Methods for preparing organohydrogensiloxanes are well known, and many are sold commercially.

The amounts of components a) and c) used in the oil phases to prepare the separate microcapsules containing Parts A and B may vary. However, the amounts used in the total siloxane composition may be adjusted to achieve a desired molar ratio of the SiH groups of component c) to the alkenyl groups present in component a). Typically, sufficient amount of component c) is used to provide a molar ratio of SiH to alkenyl groups of component a) to be greater than 1, alternatively in the range of 1 to 10, alternatively 1 to 4, alternatively 2 to 3.

The suspensions of silicate shell microcapsules may be prepared by any process known in the art. In general, there are two processes or techniques commonly used to prepare silicate shell microcapsules. The first technique involves an in-situ polymerization of a silicate precursor (sometimes referred to as a sol-gel process), after first mixing the silicate precursor with an oil phase. Representative, non limiting examples of the in-situ process are those taught in U.S. Pat. Nos. 6,159,453, 6,238,650, 6,303,149, and WO 2005/009604.

The second technique involves an ex-situ process, where the polymerization of a silicate precursor occurs via an emulsion polymerization process. Representative, non-limiting examples of such techniques are taught in WO03/066209.

In one embodiment, the silicate shell microcapsules are prepared by;

I) mixing an oil phase containing Part A or Part B of the curable siloxane composition and an aqueous solution of a cationic surfactant to form an oil in water emulsion, II) adding a water reactive silicon compound comprising a tetraalkoxysilane to the oil in water emulsion, III) polymerizing the tetraalkoxysilane at the oil/water interface of the emulsion to form a microcapsule having a core containing either Part A or Part B of the curable siloxane composition and a silicate shell, IV) combining the microcapsules containing Part A of the curable siloxane composition with the microcapsules containing Part B of the curable siloxane composition.

In this embodiment, the above process is performed twice, once to prepare microcapsules containing Part A of the curable siloxane composition, and a second to prepare the microcapsules containing Part B of the curable siloxane composition. The resulting suspensions of microcapsules are then combined to form a mixture of the microcapsules in an aqueous suspension.

Part A of the curable siloxane composition contains components a) and b) as described above. Typically, Part A contains component a) and sufficient hydrosilylation catalyst to effect the hydrosilylation reaction. For example, Part A might contain 96-98 weight percent of component a) and 2-4 weight percent of a solution of platinum catalyst (typically containing 0.52 wt % elemental Pt) as component b).

Part B of the curable siloxane composition contains component c). Part B may contain additional components, as further described below. In one embodiment, Part B of the curable siloxane composition contains both components a)

and c), that is a mixture of the organopolysiloxane having at least two alkenyl groups and the organohydrogensiloxane.

When components a) and c) are combined to form Part B, the amounts may vary, depending on the desired objectives for curing the siloxane composition. Typically the amounts range from 50-94 weight percent of component a) and 6-50 weight percent component c).

In a further embodiment, the amounts of components a) and c) used in Part B of the curable siloxane composition is such so as to provide a molar ratio of SiH/alkenyl group that varies from 3 to 10, or alternatively from 4 to 9, or alternatively from 5 to 7. The present inventors have found this ratio provides curable siloxane compositions that readily cure as thin films, such as in various coating applications, yet provide adequate storage stability as an aqueous suspension.

While not wishing to be bound by any theory, the present inventors believe combining components a) and c) in the ratios described above in Part B of the curable siloxane composition in the microcapsule suspensions allows for a partial reaction between the organohydrogensiloxane and organopolysiloxane containing alkenyl groups. It is speculated that some small amounts of the hydrosilylation catalyst from Part A may permeate through the microcapsules and suspension and cause some reaction between components a) and c), while still present in the microcapsules. Upon eventually rupturing the microcapsules, such as when allowing thin films of the suspension to dry, Parts A and B react more efficiently to form cured siloxane compositions. Thus, the present inventors have discovered an optimum ratio in this embodiment to provide excellent cure rates of the siloxane compositions, while also maintaining storage stabilities of such compositions in an aqueous based medium.

As used herein, "oil phase" encompasses Part A or Part B of the curable siloxane composition. Typically, the oil phase is a liquid when forming the oil in water emulsion. The oil phase may contain additional powders, pigments, drugs, inks, organic, silicone, or fluorocarbon based oils in combination with either Part A or Part B. However, in cosmetic applications, additional silicone oils are preferred. The oil phase may also contain any solvent or diluent, which may be added for the purpose of solubilizing solid hydrophobic compounds to create a liquid oil phase during formation of the emulsion.

The oil phase containing either Part A or B of the curable siloxane composition may contain other components, either silicone or organic based components, that are substantially soluble with the other oil phase components, and conversely, is substantially insoluble in water. Thus, other typical emollient components can include: silicones, such as volatile siloxanes, polydimethylsiloxane fluids, high molecular weight (i.e. $M_w$>1000) siloxanes, including silicone elastomers and resins; organic compounds such as, hydrocarbon oils, waxes, and emollients.

The oil phase containing either Part A or B of the curable siloxane composition may contain other components known as "burst aides". As used herein, "burst aid" encompasses any compound, or mixture of compounds added to the oil phase for the purpose of initiating temperature controlled release of the encapsulated core material. The burst aids may be selected from volatile hydrophobic organic or siloxane compounds. Burst aids might be volatile linear hydrocarbons, including but not limited to, pentane, hexane, heptane, octane, nonane; volatile cyclic hydrocarbons such as cyclopentane, cyclohexane, cycloheptane, cyclooctane; volatile branched hydrocarbons such as isohexane, isoheptane, isooctane, isodecane, isododecane; volatile linear siloxanes, including but not limited to, hexamethyldisiloxane, decamethyltetrasiloxane; volatile cyclic siloxanes such as octamethylcyclotetrasiloxane, decamethylcyclopentasiloxane, dodecylmethylcyclohexasiloxane. Alternatively, the burst aid may be selected from those known in art as "blowing agents".

The oil phase containing either Part A or B of the curable siloxane composition is mixed with an aqueous solution of a cationic surfactant to form an oil in water emulsion.

Cationic surfactants useful in this invention might be quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their salts, basic pyridinium compounds, quaternary ammonium bases of benzimidazolines and polypropanolpolyethanol amines but is not limited to this list of cationic surfactants. A preferred cationic surfactant is cetyl trimethyl ammonium chloride or bromide.

For purposes of this disclosure, the cationic surfactant may be selected from an amphoteric surfactant such as cocamidopropyl betaine, cocamidopropyl hydroxysulfate, cocobetaine, sodium cocoamidoacetate, cocodimethyl betaine, N-coco-3-aminobutyric acid compounds but is not limited to this list of amphoteric surfactants.

The above surfactants may be used individually or in combination. The cationic or amphoteric surfactant is dissolved in water and the resulting aqueous solution used as a component in aqueous or continuous phase of the oil in water emulsion of step I).

Although not wishing to be bound by any theory, the present inventors believe the use of a cationic or amphoteric surfactant promotes condensation and polymerisation of the tetraalkoxysilane, as described below, at the interface of the emulsified droplets of the oil phase, leading to non-diffusive microcapsules. The tetraalkoxysilane hydrolyzes and condenses upon reacting in the emulsion. The anionically charged hydrolysis product is attracted to the cationic or amphoteric surfactant at the interface where it forms the silicon based polymer shell.

The concentration of the cationic surfactant during the formation of the oil in water emulsion should be between 0.1% and 0.3% by weight of the oil phase concentration used. Typically, the use of low levels of cationic or amphoteric surfactant during emulsification of the oil phase and reaction with the alkoxysilane leads to microcapsules which are more resistant to diffusion or leaching of the oil phase from the microcapsules.

Auxiliary surfactants, and in particular nonionic surfactants, may be added during the formation of the oil in water emulsion. Suitable non-ionic surfactants are; polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol and alkylpolysaccharides, for example as described in U.S. Pat. No. 5,035,832 but is not limited to this list of non-ionic surfactants.

The aqueous solution of the cationic or amphoteric surfactant may contain additional/optional components, providing they are water soluble. For example a water-miscible organic solvent such as an alcohol may be added. Furthermore, other water soluble ingredients that are commonly used in personal care formulations may be added to the aqueous phase. Such ingredients include additional surfactants, thickeners, preservatives, antimicrobial, and water soluble actives and fragrances.

The oil phase and aqueous solution of the cationic or amphoteric surfactant are mixed together to form an oil in water emulsion. Mixing and emulsion formation may occur using any known techniques in the emulsion art. Typically, the oil phase and aqueous solution of the cationic or amphoteric surfactant are combined using simple stirring techniques to form an emulsion. Particle size of the oil in water emulsion may then be reduced before addition of the tetraalkoxysilane by any of the known in the art emulsification device. Useful emulsification devices in this invention can be homogenizer, sonolator, rotor-stator turbines, colloid mill, microfluidizer, blades, helix and combination thereof but is not limited to this list of emulsification devices. This further processing step reduces the particle size of the starting cationic oil in water emulsion to values ranging from 0.2 to 500 micrometers, with typical particle sizes ranging between 0.5 micrometers and 100 micrometers.

The weight ratio of oil phase containing either Part A or B of the curable siloxane composition to aqueous phase in the emulsion can generally be between 40:1 and 1:50, although the higher proportions of aqueous phase are economically disadvantageous particularly when forming a suspension of microcapsules. Usually the weight ratio of oil phase to aqueous phase is between 2:1 and 1:3. If the oil phase composition is highly viscous, a phase inversion process can be used in which the oil phase is mixed with surfactant and a small amount of water, for example 2.5 to 10% by weight based on the oil phase, forming a water-in-oil emulsion which inverts to an oil-in-water emulsion as it is sheared. Further water can then be added to dilute the emulsion to the required concentration.

In one embodiment, the density of the oil phase to the aqueous phase in the emulsion is approximately the same, that is the densities are "matched", alternatively the densities of each are within 2%, alternatively 1%, or alternatively within 0.5%

The second and third steps of the present process involve adding a water reactive silicon compound comprising tetraalkoxysilane, wherein each alkoxy group contains 1 to 4 carbons, alternatively 1 to 2 carbons, to the oil in water emulsion, and polymerizing the tetraalkoxysilane at the oil/water interface of the emulsion. Although not wishing to be bound by any theory, the present inventors believe the third step effects an "ex-situ emulsion polymerization" by which the tetraalkoxysilane precursor hydrolyzes and condenses at the oil/water interface leading to the formation of core-shell microcapsules via a phase transfer of the precursors.

The tetraalkoxysilane, such as tetraethoxysilane (TEOS), can be used in monomeric form or as a liquid partial condensate or oligomer. The tetraalkoxysilane can be used in conjunction with one or more other water-reactive silicon compound having at least two, preferably at least 3, Si—OH groups or hydrolysable groups bonded to silicon, for example an alkyltrialkoxysilane such as methyltrimethoxysilane or a liquid condensate/oligomer of an alkyltrialkoxysilane. Hydrolysable groups can for example be alkoxy or acyloxy groups bonded to silicon. The water reactive silicon compound can for example comprise 50-100% by weight tetraalkoxysilane and 0-50% trialkoxysilane. The alkyl and alkoxy groups in the tetraalkoxysilanes or other silanes preferably contain 1 to 4 carbon atoms, most preferably 1 or 2 carbon atoms. The tetraalkoxysilane, and other water-reactive silicon compound If used, hydrolyses and condenses to form a network polymer, that is a 3-dimensional network of silicon-based material, around the emulsified droplets of either Part A or Part B of the curable siloxane composition. The water-reactive silicon compound typically consists of at least 75%, or alternatively 90-100% tetraalkoxysilane. The tetraalkoxysilane provides the shell of impermeable microcapsules, forming a 3-dimensional network consisting substantially of $SiO_{4/2}$ units.

The water reactive silicon compound may also comprise an alkoxysilane having other organofunctional groups such as a quaternized substituted alkyl group. One preferred type of quaternary alkoxysilane has the formula

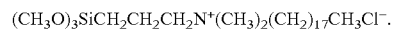

$(CH_3O)_3SiCH_2CH_2CH_2N^+(CH_3)_2(CH_2)_{17}CH_3Cl^-$.

The water reactive silicon compound is added to the oil in water emulsion (containing either Part A or B) as an undiluted liquid or as a solution in an organic solvent or in an emulsion form. The water reactive silicon compound and the oil in water emulsion are mixed during addition. The tetraalkoxysilane in the water reactive silicon compound subsequently polymerizes to form the silicon-based polymer shell on the surface of the emulsified droplets. Mixing is typically effected with stirring techniques. Common stirring techniques are typically sufficient to maintain the particle size of the starting oil in water emulsion while allowing the tetraalkoxysilane to polymerize and condense at the oil water interface The amount of tetraalkoxysilane in the water reactive silicon compound added in step II typically ranges from 6/1 to 1/13, alternatively from 1.2/1 to 1/7.3, alternatively from 1.3 to 1/6.1 based on the weight amount of oil phase present in the emulsion.

Alternatively, the amount of tetraalkoxysilane added in step II may be expressed as a weight percent of the oil in water emulsion. The weight percent of the tetraalkoxysilane added to the oil in water emulsion is at least 2 weight percent of the emulsion, alternatively at least 5 weight percent of the emulsion, alternatively at least 7 weight percent of the emulsion, alternatively at least 10 weight percent of the emulsion, or alternatively at least 12 weight percent of the emulsion.

The polymerization of the water reactive silicon compound at the oil/water interface typically is a condensation reaction which may be conducted at acidic, neutral or basic pH. The condensation reaction is generally carried out at ambient temperature and pressure, but can be carried out at increased temperature, for example up to 95° C., and increased or decreased pressure, for example under vacuum to strip the volatile alcohol produced during the condensation reaction.

Any catalyst known to promote the polymerization of the water reactive silicon compound may be added to step III to form the shell of the microcapsule. The catalyst is preferably an oil soluble organic metal compound, for example an organic tin compound, particularly an organotin compound such as a diorganotin diester, for example dimethyl tin di(neodecanoate), dibutyl tin dilaurate or dibutyl tin diacetate, or alternatively a tin carboxylate such as stannous octoate, or an organic titanium compound such as tetrabutyl titanate. An organotin catalyst can for example be used at 0.05 to 2% by weight based on the water reactive silicon compound. An organotin catalyst has the advantage of effective catalysis at neutral pH. The catalyst is typically mixed with the oil phase components before it is emulsified, since this promotes condensation of the water reactive silicon compound at the surface of the emulsified oil phase droplets. A catalyst can alternatively be added to the emulsion before the addition of the water-reactive silicon compound, or simultaneously with the water-reactive silicon compound, or after the addition of the water-reactive silicon compound to harden and make more impervious the shell of silicon-based polymer which has been formed. Encapsulation can however be achieved without catalyst. The catalyst, when used, can be added undiluted, or as a solution in an organic solvent such as a hydrocarbon, alcohol or ketone, or as a multi-phase system such as an emulsion or suspension.

The presence of colloidal silicate particles in the suspension of silicate shell microcapsules may limit the storage stability of these suspensions. Such colloid silicate particles may be considered as a side product in the tetraalkoxysilane polymerization reaction to produce the silicate shell microcapsule. The storage stability of suspensions of silicate shell microcapsules may be improved by reducing the amount of colloidal silicate particles in the suspension, or alternatively, are rendered non-reactive by the addition of a colloidal silicate sequestering agent. As used herein "a colloidal silicate sequestering agent" refers to any compound or material that when added to the silicate shell microcapsule suspension which also contains colloid silica particles, interacts with the colloidal silicate particles in such a manner so as to prevent their reaction or coagulation. Techniques for removing colloidal silicate particles and various colloidal silicate sequestering agents are further disclosed in U.S. Application No. 61/096,397.

The colloidal silicate sequestering agent may be an organofunctional silane. In one embodiment, the organofunctional silane is a quat functional trialkoxysilane. Representative, non-limiting examples of suitable quat functional trialkoxysilanes include Dow Corning® Q9-6346—Cetrimoniumpropyltrimethoxysilane Chloride.

The colloidal silicate sequestering agent may be a silicone polyether. Silicone polyethers are commercially available. Representative, non-limiting examples of suitable silicone polyethers include Dow Corning® 190, 193, and 2-5657.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Materials Used as Part A—Catalyst Blend

| Component | Description | Abbreviated Name |
|---|---|---|
| a) | Dimethylvinylsiloxy-terminated polydimethylsiloxane, Viscosity = 300-600 cP (mPa · s) at 25° C. vinyl content = 0.45% (w/w) | VINYL SILOXANE |
| b) | Karstedt catalyst (CAS Registry No. 684789-22) 1,3-Diethenyl-1,1,3,3-Tetramethyldisiloxane Complexes of Platinum dispersed in VINYL SILOXANE, to contain 0.52 wt % elemental Pt. | CATALYST |

Materials Used as Part B—Base Blend

| Component | Chemical Name | Abbreviated Name |
|---|---|---|
| a) | Dimethylvinylsiloxy-terminated polydimethylsiloxane, Viscosity = 300-600 cP (mPa · s) at 25° C. vinyl content = 0.45% (w/w) | VINYL SILOXANE |

-continued

| Component | Chemical Name | Abbreviated Name |
|---|---|---|
| c) | Trimethylsiloxy-terminated, dimethyl-methylhydrogen polysiloxane, having a viscosity = 5 cP (mPa · s) at 25° C. and containing 0.795% SiH | SiH SILOXANE |

The viscosities of the Vinyl Siloxane and SiH Siloxane were measured at 23° C. according to Dow Corning CTM 0050 using a Brookfield Rotational Viscometer with Spindle RVF #2 AT 20 RPM).

Example 1

(Comparative)

Preparation of an Emulsion Containing as an Oil Phase Part A of the Curable Siloxane A first emulsion containing as an oil phase Part A of the curable siloxane composition was prepared by mixing 45 g of VINYL SILOXANE, 1.4 g of the CATALYST, 4 g of Laureth-23, and 3 g of Pareth-3. Then, 16 g of water was added and mixed with a Hauschild SpeedMixer DAC 150 FVZ for 20 seconds. The emulsion was then progressively diluted by the addition of water to obtain a solids content of 30%. The resulting emulsion had an average volume particle size of (Dv 0.5)=3.7 micrometers. The pH was adjusted to 3.7 by addition of 2.5M HCl.

Preparation of an Emulsion Containing as an Oil Phase Part B of the Curable Siloxane A second emulsion containing as an oil phase Part B of the curable siloxane was prepared in a similar manner by first mixing 40 g of the VINYL SILOXANE, 5 g of the SiH SILOXANE, 4 g of Laureth-23, and 3 g of Pareth-3. Then, 8 g of water was added and mixed with a Hauschild SpeedMixer DAC 150 FVZ has been utilised for 20 seconds. The emulsion was then progressively diluted with water in order to obtain a solid content of 30%. The resulting emulsion had an average volume particle size of (Dv 0.5)=3.8 micrometers. The pH was adjusted to 3.7 by addition of HCl.

The emulsions containing Parts A and B are then mixed together at a 1/1 w/w ratio.

Example 2

Preparation of Suspensions of Microcapsules Containing Part A of the Curable Siloxane Composition.

A suspension of microcapsules containing Part A of the curable siloxane composition was prepared by first dissolving 3.35 g of cetyl trimethyl ammonium chloride (CTAC) in 791.9 g of water. Then, a blend of 675.6 g VINYL SILOXANE and 21 g the CATALYST was added with mixing to the CTAC/water mixture to form an O/W emulsion. In this particular case an Ultra-Turrax T25 Basic was utilised for 180 seconds at 9500 rpm. The resulting emulsion was then subjected to further shearing using an APV 1000 Homogeniser at a pressure of 700 bars to produce a fine O/W emulsion having an average particle size (Dv 0.9) below 15 μm. The pH of the resulting emulsion was adjusted to 3.7 by addition of 2.5 M HCl. Then 12.86 wt %) (based on the weight of the emulsion) of tetraethylorthosilicate (TEOS) was added with mixing at 400 rpm for 4 hours. After complete hydrolysis and condensation of the TEOS, a suspension of Core-Shell microcapsules was obtained having an average volume particle size of (Dv 0.5)=4.7 micrometers. The suspension was then diluted with water in order to obtain a solid content of 30%. Finally, 0.3% of 3-(trimethoxysilyl)-propyldimethylhexadecylammonium chloride was added to the suspension to prevent gelation at 45° C.

Preparation of Suspensions of Microcapsules Containing Part B of the Curable Siloxane Composition.

A suspension of microcapsules containing Part B of the curable siloxane composition was prepared by dissolving 3.35 g of cetyl trimethyl ammonium chloride (CTAC) in 813.5 g of water. Then 600 g VINYL SILOXANE and 75 g of the SiH SILOXANE, was added with mixing at 400 rpm to the CTAC/water mixture to form 0/W emulsion. In this particular case an Ultra-Turrax T25 Basic has been utilised for 90 seconds at 9500 rpm. The resulting emulsion was then subjected to further shearing using an APV 1000 Homogeniser at a pressure of 700 bars to produce a fine 0/W emulsion having and average particle size (Dv 0.9) below 15 μm. The pH of the resulting emulsion was then adjusted to 3.7 by the addition of 2.5 M HCl. Then 12.86% (based on the weight of the emulsion) of tetraethylorthosilicate (TEOS) was added with mixing at 400 rpm for 4 hours. After complete hydrolysis and condensation of the TEOS, a suspension of Core-Shell microcapsules was obtained having had an average volume particle size of (Dv 0.5)=3.6 micrometers. The suspension was then diluted with water in order to obtain a solid content of 30%. Finally, 0.3% of 3-(trimethoxysilyl)-propyldimethylhexadecylammonium chloride was added to the suspension to prevent gelation at 45° C.

The two aqueous suspensions containing the Microcapsules of the catalyst and base blends as prepared above were then mixed together at a 1/1 w/w ratio as based on the weight of each aqueous suspension.

Examples 3-6

Additional aqueous suspensions were prepared in a similar manner as Example 2 using the amounts of components and ingredients, as summarized in Table 1 shown below.

These examples evaluated the effect of varying the SiH/Vi ratio in Part B and the overall SiH/Vi ratio in the curable siloxane composition (that is Parts A and B combined), while maintaining a constant catalyst level (as determined by amount of elemental Pt).

Examples 7-8

(Comparative)

To further demonstrate the advantages of using microcapsules vs emulsion systems to separate Parts A and B of the curable siloxane composition, two additional suspensions were prepared. In Example 7, Part B was used as the core material in the microcapsules, while Part A was provided as an emulsion. In Example 8, Part A was used as the core material in the microcapsules, while Part B was provided as an emulsion. The aqueous suspension and emulsions used in these examples were prepared using the same procedure as described above in Examples 1 and 2. The amounts used in the examples are summarized in Table 1.

Examples 9-13

Preparation of Suspensions of Microcapsules Containing Part A of the Curable Siloxane Composition Having Different Tetraalkoxysilane Concentrations.

A suspension of microcapsules containing Part A of the curable siloxane composition was prepared by first dissolving 0.44 g of cetyl trimethyl ammonium chloride (CTAC) in 105.6 g of water. Then, a blend of 90.1 g VINYL SILOXANE and 2.8 g the CATALYST was added with mixing to the CTAC/water mixture to form an O/W emulsion. In this particular case an Ultra-Turrax T25 Basic was utilised for 180 seconds at 9500 rpm. The resulting emulsion was then subjected to further shearing using an APV 1000 Homogeniser at a pressure of 700 bars to produce a fine 0/W emulsion having an average particle size (Dv 0.9) below 15 μm. The pH of the resulting emulsion was adjusted to 2.9 by addition of 2.5 M HCl. Five aliquote of this emulsions have been taken: For example 9 to 13, 2.5 wt %, 5 wt %, 7.5 wt %, 10 wt % and 12.5 wt % of tetraethylorthosilicate (TEOS) was respectively added to each aliquots with mixing at 400 rpm for 4 hours. After complete hydrolysis and condensation of the TEOS, a suspension of Core-Shell microcapsules was obtained. The suspension was then diluted with water in order to obtain a solid content of 30%. Finally, 0.3% of 3-(trimethoxysilyl)-propyldimethylhexadecylammonium chloride was added to the suspension to prevent gelation at 45° C.

Preparation of Suspensions of Microcapsules Containing Part B of the Curable Siloxane Composition Having Different Tetraalkoxysilane Concentrations A suspension of microcapsules containing Part B of the curable siloxane composition was prepared by dissolving 0.44 g of cetyl trimethyl ammonium chloride (CTAC) in 108.5 g of water. Then 80 g VINYL SILOXANE and 10 g of the SiH SILOXANE, was added with mixing at 400 rpm to the CTAC/water mixture to form 0/W emulsion. In this particular case an Ultra-Turrax T25 Basic has been utilised for 90 seconds at 9500 rpm. The resulting emulsion was then subjected to further shearing using an APV 1000 Homogeniser at a pressure of 700 bars to produce a fine 0/W emulsion having and average particle size (Dv 0.9) below 15 μm. The pH of the resulting emulsion was then adjusted to 2.85 by the addition of 2.5 M HCl. Five aliquots of this emulsions have been taken: for example 9 to 13, 2.5 wt %, 5 wt %, 7.5 wt %, 10 wt % and 12.5 wt % of tetraethylorthosilicate (TEOS) was respectively added to each aliquots with mixing at 400 rpm for 4 hours. After complete hydrolysis and condensation of the TEOS, a suspension of Core-Shell microcapsules was obtained. The suspension was then diluted with water in order to obtain a solid content of 30%. Finally, 0.3% of 3-(trimethoxysilyl)-propyldimethylhexadecylammonium chloride was added to the suspension to prevent gelation at 45° C.

TABLE 1

|  | Part A | | | Part B | | | Weight |
| --- | --- | --- | --- | --- | --- | --- | --- |
| Example # | Vinyl siloxane (g) | Catalyst (g) | TEOS (wt %) | Vinyl siloxane (g) | SiH siloxane (g) | TEOS (wt %) | ratio of suspension A/B |
| 3 | 88.5 | 2.8 | 12.86 | 90.5 | 4.8 | 12.86 | 1/1 |
| 4 | 88.5 | 2.8 | 12.86 | 72.2 | 18 | 12.86 | 1/1 |
| 5 | 88.5 | 5.6 | 12.86 | 600 | 75 | 12.86 | 1/2 |
| 6 | 675.6 | 21 | 12.86 | 600 | 75 | 12.86 | 2/1 |
| 7* | 45 | 1.4 | 12.86 | 600 | 75 | 12.86 | 1/1 |
| 8* | 675.6 | 21 | 12.86 | 40 | 5 | 12.86 | 1/1 |
| 9 | 90.1 | 2.8 | 2.5 | 80 | 10 | 2.5 | 1/1 |
| 10 | 90.1 | 2.8 | 5 | 80 | 10 | 5 | 1/1 |
| 11 | 90.1 | 2.8 | 7.5 | 80 | 10 | 7.5 | 1/1 |
| 12 | 90.1 | 2.8 | 10 | 80 | 10 | 10 | 1/1 |
| 13 | 90.1 | 2.8 | 12.5 | 80 | 10 | 12.5 | 1/1 |

*comparative example

The reactivity of the microencapsulated reactive blends and the quality of the final film obtained was determined by coating the suspension (or emulsion) onto a silicon free Glassine paper. About 2 g of the suspensions blend were coated with a 1.2 g/m$^2$ bar equipped with an automatic film applicator (type 4340M1 from Braive Instruments). The ratio of the amount of silicon left onto the Glassine paper upon reaction before and after extraction with a good solvent for the monomers (e.g. in a 30 ml Methylisobutyl Ketone (MIBK) solution) allows to plot the amount of extractable within the film during the reaction. The silicon concentrations onto the Glassine paper were determined by XRF using a Oxford Lab-X 3000.

The reactivity was calculated by measuring the slope of the extractable plot during the first 3 minutes after the coating of the Glassine paper. The lower values demonstrate higher reactivity. The quality of the film is expressed by the extractable level measured 2 hours The results for Examples 1-8 are summarized in Table 2.

The invention claimed is:

1. An aqueous suspension of silicate shell microcapsules wherein a first portion of the silicate shell microcapsules contain as a core Part A of a curable siloxane composition comprising;
   a) an organopolysiloxane having at least two silicon-bonded alkenyl groups per molecule,
   b) a hydrosilylation catalyst,
and a second portion of the silicate shell microcapsules contain as a core Part B of the curable siloxane composition comprising;
   c) an organohydrogensiloxane having an average of greater than two silicon bonded hydrogen atoms (SiH) per molecule.

2. The aqueous suspension of claim 1 wherein Part B of the curable siloxane composition further comprises a) the organopolysiloxane having at least two alkenyl groups.

3. The aqueous suspension of claim 2 wherein the amount used of components a) and c) provides a molar ratio of the SiH

TABLE 2

|  | SiH/Vi Part B | Overall SiH/Vi in curable siloxane | Pt (ppm) | TEOS (wt %) | Aging: None | | Aging: 3 Days RT | | Aging: 1 Week 45° C. | | Aging: 2 months 45° C. | |
| --- | --- | --- | --- | --- | --- | --- | --- | --- | --- | --- | --- | --- |
|  |  |  |  |  | Reactivity (%) | Extractable (%) | Reactivity (%) | Extractable (%) | Reactivity (%) | Extractable (%) | Reactivity (%) | Extractable (%) |
| Ex. 1* | 6 | 2.8 | 79 | 0 | 58 | 11 | 65 | 28 |  |  |  |  |
| Ex. 2 | 6 | 2.8 | 79 | 12.86 | 77 | 6 | 74 | 5 | 93 | 2 | 80 | 4 |
| Ex. 3 | 2.5 | 1.27 | 79 | 12.86 | 75 | 13 | 60 | 30 |  |  |  |  |
| Ex. 4 | 12 | 5.36 | 79 | 12.86 | 26 | 52 |  |  |  |  |  |  |
| Ex. 5 | 6 | 4.4 | 79 | 12.86 | 63 | 22 |  |  |  |  | 67 | 9 |
| Ex. 6 | 6 | 1.84 | 79 | 12.86 | 80 | 5 | 82 | 4 | 70 | 6 | 68 | 9 |
| Ex. 7* | 6 | 2.8 | 79 | 12.86 |  |  |  |  | 30 | 65 |  |  |
| Ex. 8* | 6 | 2.8 | 79 | 12.86 |  |  |  |  | 67 | 29 |  |  |
| Ex. 9 | 6 | 2.8 | 79 | 2.5 |  |  |  |  | 45 | 28 |  |  |
| Ex. 10 | 6 | 2.8 | 79 | 5 |  |  |  |  | 20 | 8 |  |  |
| Ex. 11 | 6 | 2.8 | 79 | 7.5 |  |  |  |  | 13 | 6 |  |  |
| Ex. 12 | 6 | 2.8 | 79 | 10 |  |  |  |  | 11 | 6 |  |  |
| Ex. 13 | 6 | 2.8 | 79 | 12.5 |  |  |  |  | 7 | 4 |  |  |

*comparative example units of the organohydrogensiloxane to the alkenyl groups in the organopolysiloxane that is from 1 to 4.

4. The aqueous suspension of claim 3 wherein the molar ratio of the SiH units of the organohydrogensiloxane to the alkenyl groups in the organopolysiloxane used in Part B of the curable siloxane composition is from 3 to 10.

5. The aqueous suspension of claim 1 wherein the organopolysiloxane having at least two alkenyl groups comprises at least two siloxane units represented by the average formula $R^2R_mSiO_{(4-m)/2}$
wherein
R is a hydrocarbon group containing 1 to 20 carbon atoms,
$R^2$ is a monovalent alkenyl aliphatic group, and
m is zero to 2.

6. The aqueous suspension of claim 5 wherein the organopolysiloxane having at least two alkenyl groups has the average formula;

$$CH_2=CH(Me)_2SiO[Me_2SiO]_{x'}Si(Me)_2CH=CH_2$$

$$CH_2=CH-(CH_2)_4-(Me)_2SiO[Me_2SiO]_{x'}Si(Me)_2-(CH_2)_4-CH=CH_2, \text{ or}$$

$$Me_3SiO[(Me)_2SiO]_{x'}[CH_2=CH(Me)SiO]_{x''}SiMe_3$$

wherein Me is methyl, x' >0, and x" >2.

7. The aqueous suspension of claim 1 wherein the organohydrogensiloxane comprises the average formula;
$(R^3_3SiO_{1/2})_a(R^4_2SiO_{2/2})_b(R^4HSiO_{2/2})_c$ wherein
$R^3$ is hydrogen or $R^4$,
$R^4$ is a monovalent hydrocarbyl containing 1 to 10 carbon atoms,
$a \geq 2$, $b \geq 0$, $c \geq 2$.

8. The aqueous suspension of claim 7 wherein the organohydrogensiloxane is selected from a dimethyl, methyl-hydrogen polysiloxane having the average formula;

$$(CH_3)_3SiO[(CH_3)_2SiO]_b[(CH_3)HSiO]_cSi(CH_3)_3$$

where $b \geq 0$, and $c \geq 2$.

9. The aqueous suspension of claim 1 wherein the hydrosilylation catalyst is an elemental platinum group metal having a concentration of 1 to 500 ppm in the curable siloxane composition.

10. The aqueous suspension of claim 1 wherein the silicate shell microcapsules are obtained by;
I) mixing an oil phase containing Part A or Part B of the curable siloxane composition and an aqueous solution of a cationic surfactant to form an oil in water emulsion,
II) adding a water reactive silicon compound comprising a tetraalkoxysilane to the oil in water emulsion,
III) polymerizing the tetraalkoxysilane at the oil/water interface of the emulsion to form a microcapsule having a core containing either Part A or Part B of the curable siloxane composition and a silicate shell,
IV) combining the microcapsules containing Part A of the curable siloxane composition with the microcapsules containing Part B of the curable siloxane composition.

11. The aqueous suspension of claim 10 wherein the tetraalkoxysilane is tetraethoxysilane.

12. The aqueous suspension of claim 10 wherein the water reactive silicon compound further comprises $(CH_3O)_3SiCH_2CH_2CH_2N^+(CH_3)_2(CH_2)_{17}CH_3Cl^-$.

13. A process for preparing a suspension of silicate shell microcapsules comprising;
preparing a first suspension of silicate shell microcapsules by
I) mixing an oil phase containing Part A of a curable siloxane composition comprising;
a) an organopolysiloxane having at least two alkenyl groups,
b) a hydrosilylation catalyst,
and an aqueous solution of a cationic surfactant to form an oil in water emulsion,
II) adding a water reactive silicon compound comprising a tetraalkoxysilane to the oil in water emulsion,
III) polymerizing the tetraalkoxysilane at the oil/water interface of the emulsion to form a microcapsule having a core containing the oil and
a silicate shell;
preparing a second suspension of silicate shell microcapsules by
I) mixing an oil phase containing Part B of a curable siloxane composition comprising;
c) an organohydrogensiloxane having an average of greater than two silicon bonded hydrogen atoms (SiH) per molecule
and an aqueous solution of a cationic surfactant to form an oil in water emulsion,
II) adding a water reactive silicon compound comprising a tetraalkoxysilane to the oil in water emulsion,
III) polymerizing the tetraalkoxysilane at the oil/water interface of the emulsion to form a microcapsule having a core containing the oil and
a silicate shell; and
mixing the first and second suspensions together.

14. The process of claim 13 wherein the weight ratio of the first suspension mixed with the second suspension varies from 0.9 to 1.1.

* * * * *